United States Patent Office 3,298,844
Patented Jan. 17, 1967

3,298,844
PROCESS FOR REGENERATING CELLULOSE MONOTHIOLCARBONATE SOLUTION
Edward A. Swakon, Hammond, Ind., assignor to Standard Oil Company, Chicago, Ill., a corporation of Indiana
No Drawing. Filed Dec. 6, 1963, Ser. No. 328,508
11 Claims. (Cl. 106—165)

This invention relates to alkali metal cellulose reaction products suitable for regenerating cellulose as fiber filament or film and more particularly pertains to alkali metal cellulose monothiolcarbonates, solutions thereof and a method of preparing said monothiolcarbonates and their solutions.

Cellulose abundant in the framework of plants has been long used in the preparation of fiber-filaments and films as regenerated cellulose. The major sources of cellulose for such regenerated celluloses are wood and cotton fibers, mainly cotton linters which are the short cotton fibers remaining attached to the cotton seed after the longer cotton fibers have been removed. Cellulose is a complex polymeric natural product and has long been the subject of persistent research to determine its structure. However the precise structure of cellulose still awaits definitive establishment. It is known that the long chain cellulose polymeric molecule has reoccurring anhydroglucose units having three free hydroxyl groups per anhydroglucose unit. The length of the cellulose chain can vary appreciably as is indicated by molecular weight ranges in the magnitude of from 20,000 up to as high as 500,000. The spacial conformation of the natural cellulose molecule permit considerable overlapping of molecules even though individual molecules may lie side by side held together in some natural fibers such as cotton fibers by residual valence forces. The inherent properties of the cellulose molecule provide spinning of continuous regenerated cellulose filaments and the preparation of regenerated cellulose films.

In some respects cellulose functions as an alcohol in chemical reactions. For example cellulose can be reacted with alkali metal hydroxides, e.g. sodium and potassium hydroxides, and carbon disulfide to form xanthates. The simple structure of a xanthate is:

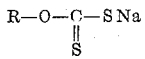

However, the cellulose xanthate is far more complex. Cellulose, in its alcohol like chemical, function, can be converted into cellulose esters by reacting one or more of the three hydroxyl groups of the anhydroglucose units with an acid such as acetic propionic and butyric acid among others. Mono, di and triester products as well as ether products intermediate mono- and di- or di- and tri-esters are possible and are made. Since cellulose exhibits chemical reactivity of polyhydroxy alcohols, mono-, di- and tri-ethers are made from ethyl, propyl, butyl, amyl, benzyl, etc. alcohols.

For the manufacture of regenerated cellulose, wood pulp or cotton linters is converted to sodium cellulose with excess sodium hydroxide of about 18 to 20% strength. The sodium cellulose is aged, a substantial portion of excess unreacted sodium hydroxide is removed, for example, pressed out or removed by centrifugal force, and then reacted with carbon disulfide to form sodium cellulose xanthate. Potassium cellulose xanthate is formed in the same manner. The cellulose xanthates upon further treatment with sodium hydroxide or potassium hydroxide, whichever was employed in the formation of the xanthate, then passes into solution as viscose. The viscose upon aging attains a viscosity suitable for extrusion into a bath which converts the xanthate into cellulose of longer more continuous nature. The reformed cellulose by this regenerating step is not identically the same as the natural cellulose starting product for there is accomplished some change in chain length. The size of the opening in the extrusion die determines whether the regenerated cellulose is formed into fiber-filament or film. When the extrusion die has a plurality of small openings, spinnerette, fiber-filaments result. When the extrusion die has a single thin slot or continuous annular slot, a sheet film or cylindrical film, respectively, regenerated cellulose films form.

For more than ten years there has existed a substantial interest in the reaction of carbonyl sulfide with alkali metal cellulose. It has been reported that sodium cellulose reacts about 200 times as rapidly with carbonyl sulfide as with carbon disulfide and the activation energy for the reaction of sodium cellulose with carbonyl sulfide is 20 kcal. per mole. The reaction product of sodium cellulose with carbonyl sulfide is sodium cellulose monothiocarbonate.

In Zeitschriftfür Elektrochemie 56, 58–61 (1952) the authors Hess and Grotjahn report that the carbonyl sulfide sodium cellulose reaction product is not completely soluble in sodium hydroxide. In Can. J. Chem. 38, 1381–94 (1960) authors Andrews, Hurtubise and Krässig report that freshly prepared white sodium cellulose monothiolcarbonate is partially soluble in aqueous 7% sodium hydroxide and indicate in one experiment described that sodium cellulose monothiolcarbonate formed at low temperatures was soluble in aqueous sodium hydroxide. The authors were mainly concerned with the finding of sodium cellulose monothiolcarbonate in viscose prepared from carbon disulfide. They reported that sodium cellulose monothiolcarbonate hydrolyzes faster than sodium cellulose xanthate. The much more rapid hydrolysis of sodium cellulose monothiolcarbonate probably accounts for no further mention of successfully preparing solutions of sodium cellulose monothiolcarbonate since the stability of such solutions was of short life.

According to East Germany Patent 14,254 of December 28, 1957, mixed xanthates of alkali metal cellulose can be prepared from a mixture of carbon disulfide and less than 20% carbonyl sulfide to take advantage of the faster reaction rate of COS. Such mixed xanthates have a substantially lower viscosity than the xanthates prepared from carbon disulfide alone.

In the study of carbonyl sulfide with alkali metal cellulose, I have also found that merely substituting carbonyl sulfide for carbon disulfide in the reaction to produce viscose that either no solution formed, the solution, if formed, was of extremely short life, in spite of COS reacting rapidly with sodium cellulose incomplete reaction occurred leaving fiber like particles or that solids formed on the inner reactor surface, or on the agitator or in the agitation vortex. It appeared, several times, that there was incipient solution formation but the stabilization of the solution was not possible because of the short fleeting life of the solution. All the difficulties associated with the preparation of solutions of sodium cellulose monothiolcarbonate are caused by the hydrolytic instability of the alkali metal monothiolcarbonate. Modification of the reaction mixture or reaction medium to offset the hydrolytic instability were to no avail.

However, I have discovered that solutions of alkali metal cellulose monothiolcarbonates can be prepared having commercially feasible stabilities. Essential to the formation of commercially feasible stable alkali metal cellulose monothiolcarbonates are the use of lower alkali metal concentrations in the preparation of alkali metal cellulose, the control of the weight ratio of alkali metal cellulose to original cellulose (press weight ratio), the temperature of reacting alkali metal cellulose with carbonyl sulfide, and the concentration of alkali metal hydroxide in the aqueous alkali metal hydroxide solution employed to dissolve the alkali metal cellulose monothiolcarbonate. By the exercise of the four foregoing essential features there is immediately obtained solutions of the viscosity suitable for extrusion into fiber-filaments or films or for use in coating paper, fabrics, other plastic films or for use in the modification of cellulose as for example, through reaction with olefin oxides, acrylonitrile, chloroacetic acid, acid chlorides, chlorohydrin, halogens, phosgene, hydrogen peroxide, sulfur chloride, metal salts, dicarboxylic acids or their anhydrides, mono- and polyisocyanates and other compounds reactive with cellulose to modify its properties. One outstanding advantage of the alkali metal cellulose monothiolcarbonate solutions, viscothiolates, prepared according to this invention is that they are immediately available with the desired viscosity for fiber-filament or film production; this is much unlike alkali metal cellulose xanthate solutions or viscose solutions which must be aged to attain the desired viscosity for processing into fiber-filaments or films. Also contrary to what might be expected from the literature reports, the viscothiolates, rather than having much lower viscosities than viscose solutions as might be expected from East German Patent 14,254/1956, are more viscous than the corresponding viscose solutions of the same cellulose concentration.

Cellulose can be regenerated from viscothiolate solution of this invention by acidification with dilute mineral acid such as dilute sulfuric acid or with a weak acid such as acetic acid. Cellulose can also be regenerated by heating the viscothiolate solution to moderate temperatures, say in the range of 25 to 50° C. or higher if desired. Thus paper or fabric coated with viscothiolate solution will have regenerated cellulose deposited thereon by drying the coated paper and/or fabric at low to ordinary drying temperatures. Upon regenerating cellulose from the viscothiolate solutions by acidification, COS is not given off but rather approximately equimolecular proportions of carbon dioxide and hydrogen sulfide are liberated. This suggests that regeneration of cellulose by acidification of the viscothiolate solutions prepared according to this invention takes place by hydrolysis of sodium cellulose monothiolcarbonate to cellulose and disodium monothiolcarbonate which disodium salt is neutralized by the acid thus liberating $CO_2$ and $H_2S$. This theory of cellulose regeneration by acidification of the viscothiolate solution with dilute mineral acids is supported by the fact that the sodium cellulose monothiolcarbonate is rather hydrolytically unstable and water can be used to regenerate cellulose admixed with disodium monothiolcarbonate.

Cellulose regeneration from the viscothiolate solutions of this invention also can be accomplished through oxidation with hydrogen peroxide, halogen or metal salts at atmospheric pressure or at elevated pressures. When coated paper or fabric is prepared from the viscothiolate solutions of this invention the alkali metal moiety residue of the viscothiolate can be readily washed away with water.

Regenerated cellulose fiber filaments are prepared by extruding the viscothiolate solution through spinnerettes (plurality of fine holes) of the desired filament diameter into the regenerating agent or environment. Films of regenerated cellulose can be made by extruding the viscothiolate solution through a die of the desired slot size or of the desired annular slot size into the regenerating medium or by casting or coating the viscothiolate solution on a flat surface or large cylinder, contacting the coat with regenerating medium and then peeling off the film.

The viscothiolate solutions of this invention can be prepared from any source of cellulose, for neither the source of the cellulose nor its state of refinement are critical to the preparation of viscothiolate solutions of this invention or to the utilization of viscothiolate solutions of this invention. For example, cellulose from soft and hard woods made by any of the conventional pulping processes for example sulfide process, kraft process or soda process are suitable sources of raw material cellulose. These pulps, of course, can be bleached pulps. Other suitable sources of cellulose include cellulose from kapok, cotton, cotton linters, cotton rag waste and the like. Also, cellulose derived from grasses such as ramie, green straw, flax, bast fibers, bamboo, bagasse, corn stalks and the like can be used. Reclaimed cellulose as for example from bleached and/or deinked pulp from used printed paper or scrap crepe tissue, writing paper and the like can be used. Thus, for the process of preparing the viscothiolate solutions of this invention any source of fresh primary cellulose, used cellulose or reclaimed cellulose can be employed. For economic considerations usually cellulose sources containing alpha-cellulose in the range of from 87 to 95% or higher is used to minimize the consumption of caustic solutions during processing.

As hereinbefore stated there are four factors essential to obtaining stable viscothiolate solutions. These are the concentration of alkali metal hydroxide solutions in the preparation of alkali metal cellulose, the press weight ratio, the temperature of reaction between COS with alkali cellulose and the strength of aqueous alkali metal hydroxide solution employed to dissolve the alkali cellulose monothiolcarbonate in forming the viscothiolate solution. Each of these essential factors will be separately discussed and contrasted with the analogous preparation of viscose solutions.

In the preparation of alkali metal xanthate solutions, viscose solutions, cellulose high in alpha-cellulose is steeped in moderate strength aqueous alkali metal hydroxide for example, 17 to 20% sodium hydroxide for at least one hour at 18 to 25° C. The steeping time varies from pulp to pulp, i.e. source of cellulose. This steeping causes the cellulose to swell and increases its chemical reactivity. The steeping also permits the removal of hemicellulose and other caustic soluble impurities. For the preparation of alkali metal cellulose monothiolcarbonates, the cellulose is also steeped in aqueous solution of alkali metal hydroxide to swell the cellulose and remove impurities soluble in the aqueous caustic. However, here the strength of the aqueous caustic solution is much lower. Suitable the cellulose is steeped in aqueous caustic solution of a strength not exceeding about 15%. Desirably, the strength of the caustic is in the range of 3 to 15% and preferably in the range of 5 to 12%. These ranges are applicable for both sodium hydroxide and potassium hydroxide solutions taking into account the use of equivalent amounts of each alkali metal hydroxide. The use of aqueous caustic solutions of above 15% causes irreversible gellatin and/or solidification during reaction with COS. Steeping the cellulose in moderate strength caustic, i.e. 17 to 20% and then adding additional water does not appear to overcome the adverse effect of the stronger caustic during reaction with COS. As in the viscose process the alkali metal hydroxide solutions used in steeping and elsewhere in the formation of viscothiolate solutions according to this invention should be free from such metals as iron and manganese and also substantially chloride-free. No advantage has been found for the use of aqueous caustic solutions of a strength below 3 to 5%, but such lower strength caustic solutions can be employed if steeping capacity is of no importance.

As in the viscose process, the caustic steep liquor is drained and absorbed aqueous caustic is removed from the swollen cellulose by pressing in a mechanical or hydraulic press or by subjecting the swollen cellulose to centrifugal force as in a centrifugation. Excess caustic which would form useless by-product and needlessly consume COS is thus removed along with substantial amounts of materials soluble in aqueous caustic. The press weight, weight ratio of alkali cellulose to orginal cellulose charged to steeping, may very suitably be in the range of from 2 to 10 depending on the source of cellulose employed. The main criteria here with respect to press weight is to provide a manageable alkali cellulose for reaction with COS. Typical press weight ratios of various cellulose sources after steeping with aqueous sodium hydroxide (10% NaOH) are as follows.

| Cellulose source: | Press weight |
|---|---|
| Bleached hardwood sulfite pulp | 3 |
| VC sulfite pulp | 2.75 |
| Bleached sulfite pulp | 3 |
| KK kraft pulp | 3 |
| Chemical cotton | 5 |

In the viscose process alkali cellulose cake after removal of absorbed caustic is shredded by revolving blades having serrated edges. The shredding is conducted at 18 to 30° C. for 1 to 2 hours or until the alkali cellulose cake is fibrillated into a finely divided uniform fluffy particle known as "white crumbs." The shredding cannot be carried out to the extent that the alkali cellulose is cut or ground. The formation of "white crumbs" is essential for the viscose process where optimum reactivity with the slower reacting carbon disulfide is involved. However, in the process of preparing viscothiolate solutions of this invention, the alkali cellulose cake need not be fibrillated to the "white crumb" condition but rather the cake is only moderately shredded. Usually the foregoing typical press weights of the various pulps in chemical cotton need very little or no shredding except that which is encountered in the reactor where reaction with COS is conducted. While the "white crumbs" employed in the viscose process are reacted with carbon disulfide in large hexagonal or cylindrical churn (barattes), the reaction between alkali cellulose and COS can be carried out in a stirred reaction vessel for this reaction is of very short duration in contrast to the 1.5 to 3 hour carbon disulfide reaction at 20 to 30° C. Thus, for the preparation of viscothiolates according to the invention the alkali cellulose cake can be moderately broken up before charging to the reaction vessel and therein further broken up by the agitator blades prior to and during reaction with COS. Thus, for all intents and purposes, the alkali cellulose cake need not be shredded as is essential in the viscose process.

In the viscose process the "white crumbs" produced by the shredding process are stored in enclosed steel containers for 1 to 3 days at substantially constant room temperature in the range of 18 to 30° C. There has also been employed an accelerated aging process said to require but 2 hours but this accelerated aging requires careful control of temperature and other physical conditions and is usually conducted during the shredding step. During either the normal or accelerated aging, through sorption of atomspheric oxygen there occurs a reduction in length of the long cellulose molecule chain. This reduction in chain length is essential in the viscose process to obtain viscose solutions of the correct viscosity suitable for further processing. This aging is exothermic and hence the temperature thereof, the duration, the rate of oxygen diffusion, the reactivity of the alkali cellulose and the prsence of metallic impurities are important factors. In contrast to this, the preparation of the viscothiolate solutions of this invention do not appear to require aging, either normal or accelerated, for viscothiolate solutions can be directly obtained would have the desired viscosity properties for further processing. The reaction between carbonyl sulfide and alkali cellulose is exothermic as is the reaction between carbon disulfide and alkali cellulose. In contrast to the reaction temperatures in the xanthating of alkali cellulose with carbon disulfide of from 20 to 30° C., the exothermic reaction between alkali cellulose and carbonyl sulfide must be conducted at a lower temperature. The carbonyl sulfide reaction with alkali cellulose must be conducted below about 10° C. for if the reaction temperature is permitted to go much above 5° C., for example, 10 to 15° C. gellation and/or solidification occurs. This gellation and/or solidification is irreversible and complete solution will never be obtained in dilute aqueous caustic. Carbonyl sulfide will reaction quite readily and rapidly even at temperatures below about —10° C., however, this reaction is perferably carried out at a temperature in the range of —5 to 5° C. Carbonyl sulfide can be added to the reaction vessel containing alkali cellulose until no further carbonyl sulfide is taken up at temperatures below 10° C. The manner in which carbonyl sulfide is added to alkali cellulose is not critical. The carbonyl sulfide can be added all at once provided the reaction temperature can be maintained below 10° C. Also, the carbonyl sulfide can be added slowly to the alkali cellulose depending on the manner in which the carbonyl sulfide is added to the alkali cellulose. The resulting product may be diluted immediately with dilute aqueous caustic solution, for example, when carbonyl sulfide is added slowly, or the mixing may be conducted for a short period as when the carbonyl sulfide is added rapidly or all at once. The amount of carbonyl sulfide added to the alkali cellulose is suitably in the range of from 0.20 to 0.8 weight part per unit weight of original dry cellulose.

As hereinabove noted, the dilute aqueous caustic solution is added directly to the product resulting from the reaction of alkali cellulose with carbonyl sulfide. Here dilute aqueous caustic in the range of 1 to 10% sodium or potassium hydroxide is employed. It is preferred to have the dilute aqueous caustic solution at a low temperature, that is, below 25° C., desirably below 15° C. and preferably below 10° C. Here good mixing is important. Where the stirring device in the reaction vessel is not variable, that is, where high speed stirring cannot be obtained, the dilute caustic and alkali cellulose monothiolcarbonate mixture is transferred to a vessel where high speed shearing stirring comparable to that provided by a Waring Blendor on the small scale. Such high speed shearing stirring is essential to the formation of complete solution for, rather than a solution of low viscosity forming as forecast from the East German Patent 14,254, the resulting solution is in general more viscous than the corresponding viscose solutions containing the same concentration of cellulose. Thus, unless high speed stirring is used, not all of the reaction product would become dissolved in the rather viscous solution. The amount of dilute aqueous caustic added will vary according to the viscosity desired for the resulting solution, however, the amount of dilute caustic added generally is that amount which will provide in the solution about 6 to 8% cellulose in its monothiolcarbonate form. The resulting viscothiolate solution can be filtered to remove dirt or foreign matter or any other undissolved particles in the viscothiolate solution to prevent plugging of extruder dies used in the preparation of fiber-filaments or extruded films. It is also desirable to filter the viscothiolate solution so that undissolved contaminants do not appear in the cast films.

Prior to extruding or casting and especially prior to extruding fiber-filaments gloss-reducing substances are added to the viscothiolate solution where dull-appearing yarns are preferred. This dulling can be achieved by the addition of high-boiling mineral oils or by the addition of special pigments such as titanium dioxide, barium sulfate, etc. for example, dull yarns approximately 6 to 8% of oil can be used and for full dull yarns 0.5 to 1.5% titanium dioxide based on cellulose weight may be used.

Also, before spreading or extruding or any other further processing to prepare fiber-filaments and/or films, any air bubbles present in the viscous liquid should be removed by deaeration, for example, by applying reduced pressure to the viscous viscothiolate solutions.

In the preparation of viscose solutions after xanthating the alkali cellulose with carbon disulfide (30-40% $CS_2$ on dry weight of original cellulose) at 20 to 30° C. for 1.5 to 3 hours, the alkali cellulose xanthate is added to an aqueous caustic solution. Two to six hours are required to dissolve the alkali cellulose xanthate in aqueous caustic at a temperature controlled in the range of 15 to 20° C. After the solution is formed known as viscose solution, dulling agents are added if the final product is not desired in the natural high gloss condition. After the viscose solution is formed, it is filtered to remove undissolved material and solid contaminants. The filtered viscose solution must be ripened or aged for a period of from 2 to 4 days at a temperature usually between 15 to 30° C. During this ripening or aging period the viscose solution develops the proper and desired viscosity for processing into fiber-filament or film.

It is readily apparent from the comparison of the procedural steps of preparing viscothiolate solutions against the steps of preparing viscose solutions that not only are several of the steps essential for the preparation of viscose solutions eliminated but also a substantial saving in time is achieved by the preparation of viscothiolate solutions for fiber-filament and film production. Furthermore, in the production of viscothiolate solutions these solutions are readily formed directly after the reaction with carbonyl sulfide and are immediately ready for use. An additional advantage achieved through the use of carbonyl sulfide rather than carbon disulfide involves the elimination of the use of the inherently hazardous carbon disulfide.

For the purposes of this invention the amount of COS to be added to the alkali metal cellulose is desirably in the range of from 0.2 to 0.8 of the dry weight of the cellulose. More than 0.8 can be used without disadvantage other than excessive use of COS.

With respect to the regeneration of cellulose from the viscothiolate solution, the same procedures commonly used in the making of fiber-filaments and film from viscose solutions can be used. More specifically, the same type of acidic spinning baths or combinations of salts and acids in aqueous solution commonly used in regenerating cellulose from viscose solutions can be used in the regenerating of cellulose from viscothiolate solutions.

For a clearer understanding of the nature of viscothiolate solutions and the preparation thereof, the following illustrative examples are presented.

*Example I*

15 g. VC Sulfite Pulp was steeped in 10% by weight solution of sodium hydroxide for one-half hour at room temperature. Excess caustic solution was squeezed out to obtain 41 g. of sodium cellulose (press weight ratio of 2.75). The product was shredded in a Waring Blendor and then transferred to a 3-neck, round-bottomed flask equipped with a stirrer, Dry Ice condenser, gas inlet and ice-salt bath. Temperature of the sodium cellulose was lowered to 0° C. before addition of carbonyl sulfide was started. 7 g. COS was condensed in a Dry Ice trap and connected to the reactor with rubber tubing. Carbonyl sulfide passed into the reactor at approximate the proper rate by simply allowing it to evaporate from the cold trap in air. Addition took 17 minutes and at one time the temperature reached 9° C. Material was mealy and had a greenish-yellow tinge. Mixing was continued for 25 minutes after carbonyl sulfide addition. 200 ml. of cold 5% sodium hydroxide solution was added to the sodium cellulose monothiolcarbonate and then transferred to the Waring Blendor. A very viscous solution was obtained, whereupon 200 ml. of cold water was added. A complete solution was obtained. It was hazy from whipped air. Some of the material was placed in a suction flask and a film formed along the walls of the flask. When the film dried, it was stiff, translucent and crackled; the use of a plasticizer might aid in the flexibility. The remaining product gelled while standing overnight. Gellation does not start for several hours if the solution is kept cold.

*Example II*

15 g. of bleach sulfite pulp was steeped in 10% sodium hydroxide solution at room temperature for one-half hour. Excess caustic solution was squeezed out, leaving 46 g. of sodium cellulose (press weight ratio of 3). Sodium cellulose was transferred to a 3-neck flask as in Example I and cooled to 1° C. 8 g. of carbonyl sulfide was added over a period of 35 minutes. Product was mealy and had a yellowish tinge. 200 ml. of cold 5% sodium hydroxide solution was added and the material transferred to a Waring Blendor. A viscous solution was obtained and an additional 200 ml. of cold water was added. Material was viscous and no fibers were visible. Product dissolved readily in caustic solution to form a viscous solution and fibers were not decernable. The solution can be used to make film and fibers and for coating cloth and paper. The cold solution can be kept for a few hours before gellation begins. When the solution is allowed to come to room temperature and stand overnight, a gel is obtained.

*Example III*

15 g. KK kraft pulp was steeped in 10% sodium hydroxide solution for one-half hour at room temperature. Excess caustic solution was squeezed out to obtain 46 g. of sodium cellulose. Product was shredded in Waring Blendor, transferred to 3-neck flask and cooled to 1° C. before starting the carbonyl sulfide addition. 8 g. of carbonyl sulfide was added over a 35 minute period and the maximum temperature reached was 6° C. Product was mealy. 400 ml. of 2.5% sodium hydroxide solution was added and product transferred to Waring Blendor. After a few minutes of stirring an additional 150 ml. of cold water was added. The solution was still quite viscous. The pulp was completely dissolved. On standing overnight, the solution gelled.

*Example IV*

15 g. bleached sulfite pulp was steeped in 10% sodium hydroxide solution for one-half hour at room temperature. After squeezing out the excess caustic solution, 46 g. of sodium cellulose was obtained. Sodium cellulose was shredded in a Waring Blendor and then transferred to the 3-neck flask. After the material has been cooled to 1° C., 8 g. of carbonyl sulfide was added over a 35 minute period. The maximum temperature reached was 4° C. 400 ml. of cold 5% sodium hydroxide solution was added to the sodium cellulose monothiolcarbonate and transferred to a Waring Blendor. A viscous homogeneous solution was obtained. Parts of this solution were reacted with phenyl isocyanate, chloroacetic acid, iodine, hydrogen peroxide, zinc acetate, copper acetate, propylene oxide, and ethylene chlorohydrin to modify the cellulose material.

*Example V*

15 g. chemical cotton was steeped in 10% sodium hydroxide solution for one-half hour at room temperature. Excess sodium hydroxide was squeezed out, leaving 75 g. of sodium cellulose. Product was shredded in a Waring Blendor, and transferred to a round bottom flask as described in Example 1. After the temperature of sodium cellulose reached 1° C., 8 g. of COS was added over a 25 minute period and stirring continued for an additional 10 minutes. All of the COS appeared to be taken up. 300 ml. of cold 5% sodium hydroxide solution was added and the product transferred to the Waring Blendor. The product was very viscous, and an additional 100 ml. of cold water added. Cotton was completely soluble in the viscose solution. 40 ml. monochloroacetic acid was then added to the sodium cellulose monothiolcarbonate solution and a white product made up of partly gelled material and fine fibers was obtained.

The process of this invention as illustrated in the foregoing examples can be carried out by substituting aqueous potassium hydroxide or lithium hydroxide solutions for the sodium hydroxide solutions in the method of the foregoing examples. When using lithium hydroxide the usual compensation for this hydroxide with regard to its difference over sodium hydroxide is to be taken into account because of the hydrolytic instability sensitivity of the alkali metal cellulose monothiolcarbonates. Using alkali metal sulfonates, such as sodium xylene sulfonate, to form the alkali metal cellulose although apparently successful results in the formation of a pasty mass when COS is added to the resulting mixture.

What is claimed is:

1. A method of preparing an aqueous alkaline solution of a carbonyl sulfide derivative of alkali metal cellulose which comprises steeping cellulose in an aqueous solution of alkali metal hydroxide having an alkali metal content not exceeding 15% by weight and in an amount of said solution in excess of that required to form the alkali metal cellulose whereby during said steeping the cellulose swells and alkali metal cellulose forms, removing the steep liquor from the alkali metal cellulose to obtain a wet alkali cellulose mass of a press weight in the range of 2 to 10, reacting said wet alkali cellulose mass with carbonyl sulfide at a temperature below 10° C., thereafter diluting the product resulting from said carbonyl sulfide reaction with an aqueous solution of alkali metal hydroxide having 1 to 10% alkali metal hydroxide by weight at a temperature below 25° C., subjecting said diluted reaction product to high speed shearing stirring whereby an aqueous alkaline solution of a carbonyl sulfide derivative of alkali metal cellulose forms from which regenerated cellulose may be obtained without aging of said aqueous alkaline solution.

2. The method of claim 1 wherein the aqueous solution in the steeping step is an aqueous solution having 3 to 15% sodium hydroxide by weight and the alkali metal hydroxide in the aqueous solution used in the diluting step is sodium hydroxide.

3. The method of claim 2 wherein the COS reaction is carried out at −5 to 5° C.

4. The method of claim 2 wherein the amount of COS used to react with sodium cellulose is in the weight ratio of 0.2 to 0.8 based on dry weight of the cellulose to be steeped.

5. A method of preparing regenerated cellulose which comprises steeping cellulose in an aqueous solution having 3 to 15% sodium hydroxide by weight in an amount in excess of that required to form sodium cellulose, removing the steep liquor from sodium cellulose to obtain a wet sodium cellulose cake of press weight in the range of 2 to 10, reacting the wet sodium cellulose cake with carbonyl sulfide at a temperature below 10° C. until no further carbonyl sulfide is taken, diluting the carbonyl sulfide reaction product with an aqueous solution having 1 to 10 sodium hydroxide by weight, mixing said diluted reaction product with high speed shearing stirring until a homogeneous solution forms, thereafter and without aging said homogeneous solution regenerating cellulose from said homogeneous solution.

6. The method of claim 5 wherein filaments of regenerated cellulose are prepared by extruding said homogeneous solution through a spinnerette into a dilute aqueous solution of mineral acid.

7. The method of claim 5 wherein film of regenerated cellulose is prepared by extruding said homogeneous solution into a dilute aqueous solution of mineral acid.

8. The method of claim 5 wherein the cellulose to be steeped is wood pulp.

9. The method of claim 5 wherein the cellulose to be steeped is cotton.

10. A homogeneous solution comprising a carbonyl sulfide derivative of alkali cellulose diluted with an aqueous solution having 1 to 10% alkali metal hydroxide.

11. A homogeneous solution comprising a carbonyl sulfide derivative of sodium cellulose diluted with an aqueous solution having 1 to 10% sodium hydroxide.

No references cited.

ALEXANDER H. BRODMERKEL, *Primary Examiner.*

J. H. WOO, *Assistant Examiner.*